United States Patent
Sema

(10) Patent No.: US 12,420,871 B2
(45) Date of Patent: Sep. 23, 2025

(54) VEHICLE COWL STRUCTURE

(71) Applicant: SUBARU CORPORATION, Tokyo (JP)

(72) Inventor: Hiroaki Sema, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 397 days.

(21) Appl. No.: 18/115,509

(22) Filed: Feb. 28, 2023

(65) Prior Publication Data
US 2023/0294483 A1 Sep. 21, 2023

(30) Foreign Application Priority Data

Mar. 21, 2022 (JP) .................... 2022-044775

(51) Int. Cl.
B62D 25/08 (2006.01)
B60H 1/28 (2006.01)
B60R 13/07 (2006.01)

(52) U.S. Cl.
CPC ............. B62D 25/081 (2013.01); B60H 1/28 (2013.01); B60R 13/07 (2013.01)

(58) Field of Classification Search
CPC .......... B60H 1/28; B60R 13/07; B62D 25/081
USPC ........................................................ 296/192
See application file for complete search history.

(56) References Cited

U.S. PATENT DOCUMENTS 5,669,986 A * 9/1997 Buchanan, Jr. ........... B60S 1/50
                                                          15/103
7,976,097 B2 * 7/2011 Watanabe ................ B60H 1/28
                                                          296/192
8,702,155 B2 * 4/2014 Suzuki ................ B62D 25/081
                                                          D12/91
10,150,453 B2 * 12/2018 Busiello ............. B01D 21/0045
10,449,925 B2 * 10/2019 Tastekin ............... B62D 25/081
(Continued)

FOREIGN PATENT DOCUMENTS

JP         H10316031 A   * 12/1998
JP         2004058722 A  *  2/2004
(Continued)

OTHER PUBLICATIONS

Machine Translation of JP6979260B2, May 21, 2025.*
Machine Translation of JP2004058722A, May 21, 2025.*
Machine Translation H10316031A, May 21, 2025.*

Primary Examiner — Jason S Morrow
(74) Attorney, Agent, or Firm — McGinn I.P. Law Group, PLLC

(57) ABSTRACT

A vehicle cowl structure includes a cowl body, a cowl panel, an air outlet, and a gas-liquid separation mechanism. The cowl body has a recessed shape with an upper opening when viewed in a longitudinal direction thereof. The cowl panel closes the upper opening of the cowl body, and has an outside air inlet. The outside air inlet allows outside air to be introduced into the cowl body. The air outlet allows air inside the cowl body to be discharged toward a vehicle interior. The gas-liquid separation mechanism is disposed between the outside air inlet and the air outlet and allows the air and liquid inside the cowl body to be separated from each other. The gas-liquid separation mechanism includes a lower blocker, an upper blocker, and an air suction part. The air suction part allows the air inside the cowl body to be drawn out.

12 Claims, 4 Drawing Sheets

(56) References Cited

U.S. PATENT DOCUMENTS

| | | | | |
|---|---|---|---|---|
| 11,772,457 | B2* | 10/2023 | Mogi | B62D 25/081 |
| | | | | 296/192 |
| 12,115,946 | B2* | 10/2024 | Carroll | C02F 1/001 |
| 2011/0076435 | A1* | 3/2011 | Tachibana | B62D 25/081 |
| | | | | 428/192 |
| 2018/0170446 | A1* | 6/2018 | Muraki | B60R 13/07 |
| 2023/0294773 | A1* | 9/2023 | Ohguma | B62D 25/081 |
| | | | | 296/192 |

FOREIGN PATENT DOCUMENTS

| | | | |
|---|---|---|---|
| JP | 2007-125995 A | | 5/2007 |
| JP | 6979260 B2 | * | 12/2021 |

* cited by examiner

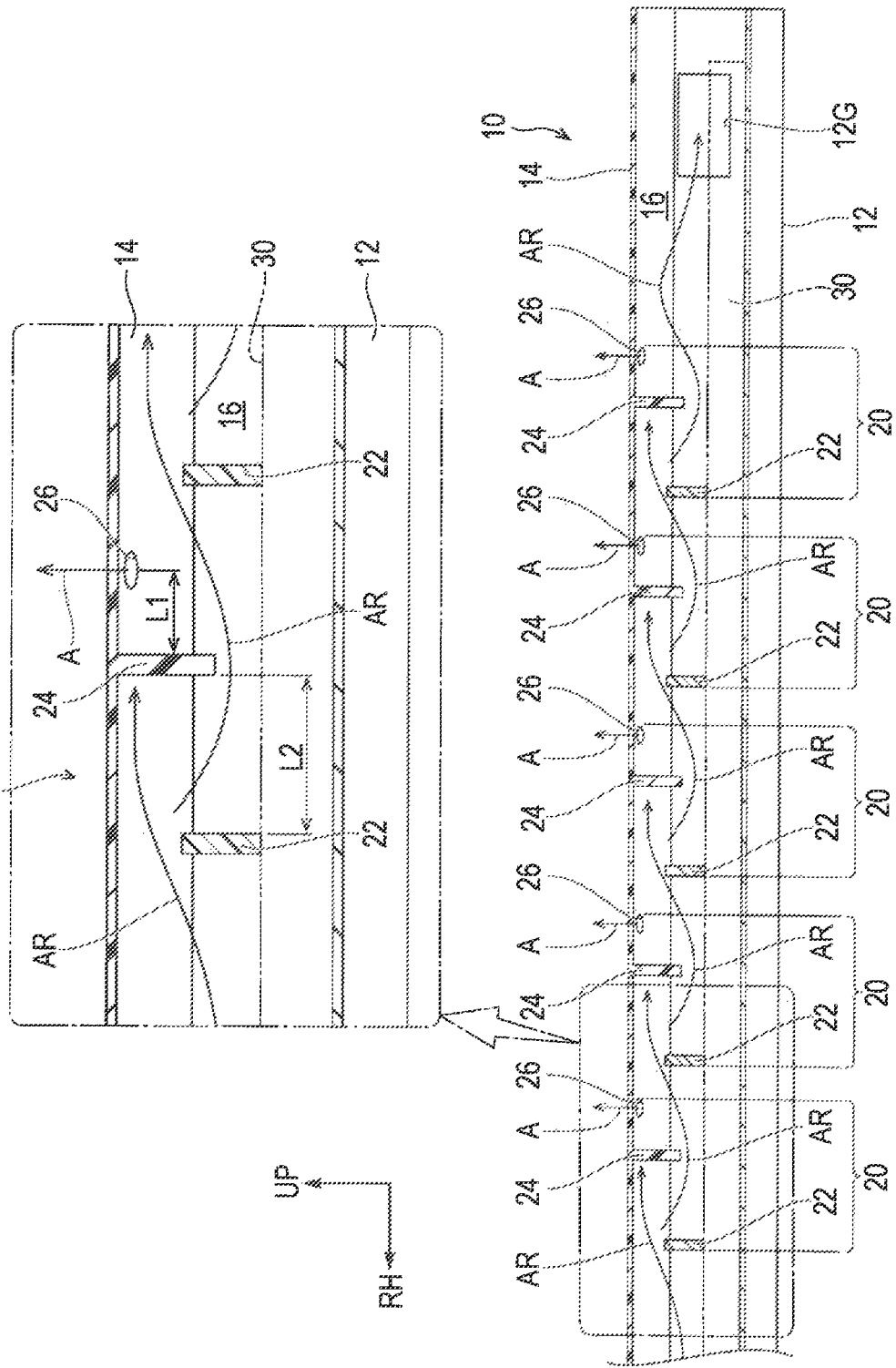

VEHICLE COWL STRUCTURE

CROSS-REFERENCE TO RELATED APPLICATIONS

The present application claims priority from Japanese Patent Application No. 2022-044775 filed on Mar. 21, 2022, the entire contents of which are hereby incorporated by reference.

BACKGROUND

The disclosure relates to a vehicle cowl structure.

A vehicle cowl structure is configured to, when outside air is introduced into a cowl, allow air and liquid such as rainwater contained in the outside air to be separated from each other, and the separated air to be sent to an air conditioner side. For example, Japanese Unexamined Patent Application Publication (JP-A) No. 2007-125995 discloses a cowl structure in which a cowl duct is provided in a cowl and partitions the inside of the cowl. The cowl duct has a hole through which air is sent to the air conditioner side and a rib around the hole. Thus, when the outside air is introduced into the cowl, the rib of the cowl duct allows the air and the liquid such as rainwater contained in the outside air to be separated from each other.

SUMMARY

An aspect of the disclosure provides a vehicle cowl structure for a vehicle. The vehicle cowl structure includes a cowl body, a cowl panel, an air outlet, and a gas-liquid separation mechanism. The cowl body extends in a vehicle width direction on a vehicle front side of a lower end of a windshield glass of the vehicle and has a recessed shape with an upper opening when viewed in a longitudinal direction of the cowl body. The cowl panel extends in the vehicle width direction on a vehicle upper side of the cowl body, closes the upper opening of the cowl body, and has an outside air inlet. The outside air inlet is disposed at an end of the cowl panel on a first side in the vehicle width direction and configured to allow outside air to be introduced into the cowl body. The air outlet is disposed at an end of the cowl body on a second side in the vehicle width direction and configured to allow air inside the cowl body to be discharged toward a vehicle interior of the vehicle. The gas-liquid separation mechanism is disposed between the outside air inlet and the air outlet and configured to allow the air and liquid inside the cowl body to be separated from each other. The gas-liquid separation mechanism includes a lower blocker, an upper blocker, and an air suction part. The lower blocker is provided to a bottom wall of the cowl body or a mounted component accommodated in the cowl body, and extends from the bottom wall or the mounted component to the vehicle upper side. The upper blocker is provided to the cowl panel, disposed on the second side in the vehicle width direction with respect to the lower blocker, and extends from the cowl panel to a vehicle lower side. The air suction part is provided to the cowl panel, disposed on the second side in the vehicle width direction with respect to the upper blocker, and configured to allow the air inside the cowl body to be drawn out.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 4 is a schematic, front sectional view (enlarged sectional view taken along line 4-4 in FIG. 2) of an inside of a left part of the vehicle cowl structure illustrated in FIG. 2.

DETAILED DESCRIPTION

Figure 1:
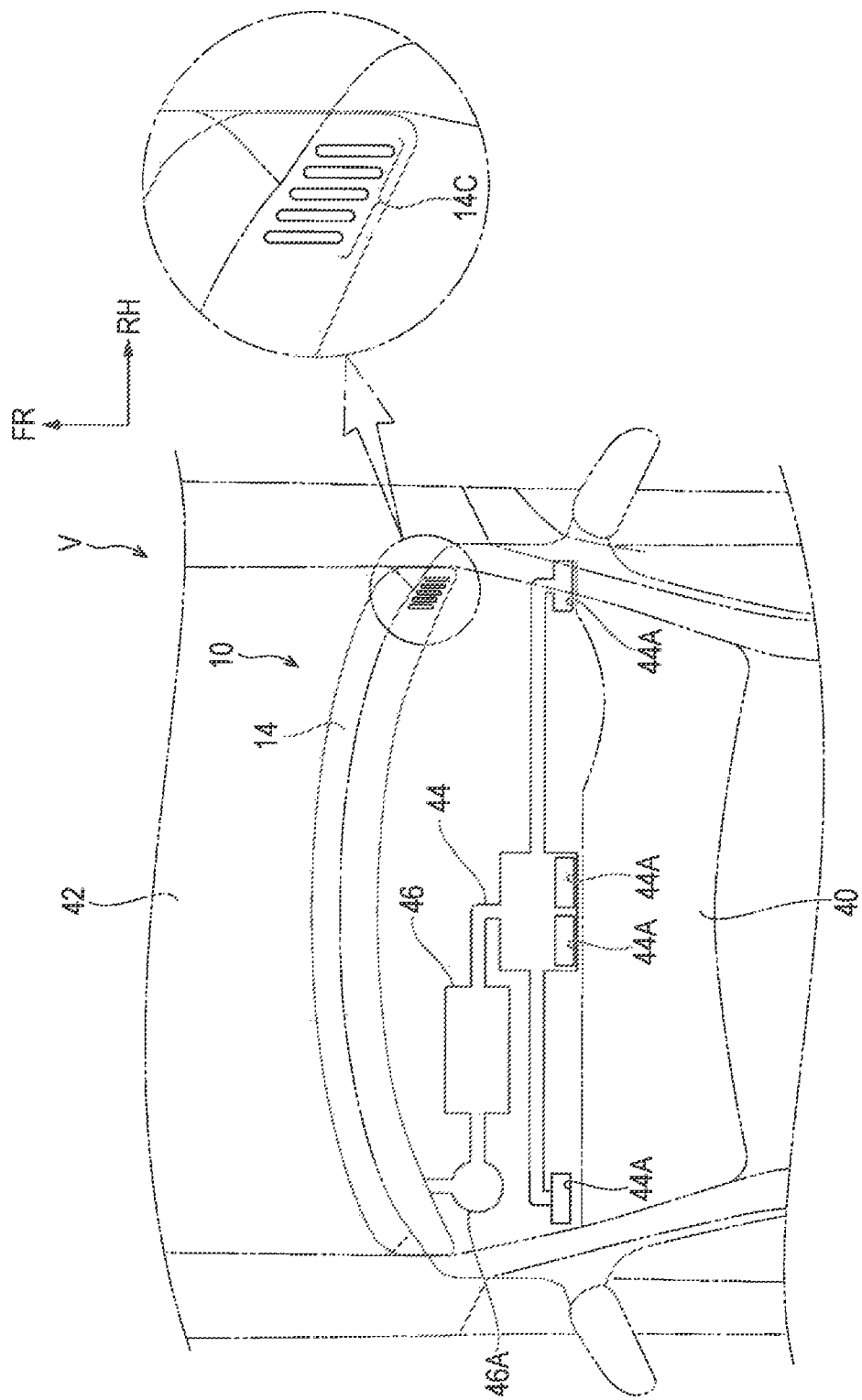
FIG. 1 is a partially schematic, top plan view of a front part of a vehicle to which a vehicle cowl structure according to the present embodiment is applied.

Recent trend is that a passageway for air in a cowl is relatively narrow when a wiper unit, an airbag, and the like are mounted in the cowl. This results in a relatively high flow velocity of outside air flowing through the cowl, and difficulty in achievement of satisfactory separation between air and liquid contained in the outside air. Thus, the cowl structure is desired to achieve satisfactory separation between the liquid and the air.

It is desirable to provide a vehicle cowl structure that makes it possible to achieve satisfactory separation between liquid and air.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

A vehicle cowl structure 10 (hereinafter, simply referred to as a cowl structure 10) according to the present embodiment will be described with reference to the drawings. Note that, arrow UP, arrow FR, and arrow RH, which are illustrated as appropriate in the drawings, indicate a vehicle upper side, a vehicle front side, and a vehicle right side (a first side in a vehicle width direction), respectively, of a vehicle (automobile) V to which the cowl structure 10 is applied. In the following description, unless otherwise specified, an up-down direction, a front-rear direction, and a left-right direction refer to a vehicle up-down direction, a vehicle front-rear direction, and a vehicle left-right direction, respectively.

Overall Configuration

As illustrated in FIG. 1, the cowl structure 10 is disposed on a front side of a lower end (front end) of a windshield glass 40 of the vehicle V, and on a lower side of a rear end of a hood 42 of the vehicle V. The cowl structure 10 has a substantially cylindrical shape extending in the vehicle width direction as a whole. An inside of the cowl structure 10 serves as a cowl duct part 16 (see FIG. 3). The cowl structure 10 has outside air inlets 14C and an air outlet 12G (see FIG. 4). Each of the outside air inlets 14C is configured to allow outside air (air) to be introduced into the cowl duct part 16. The air outlet 12G is configured to allow the air introduced into the cowl duct part 16 to be discharged toward a vehicle interior. One end of an air-conditioning duct 44 of the vehicle V is coupled to the air outlet 12G. The air discharged from the air outlet 12G into the air-conditioning duct 44 is supplied into the vehicle interior through air vents 44A. The air vents 44A constitute the other ends of the air-conditioning duct 44. An air conditioner 46 is provided to an intermediate part of the air-conditioning duct 44 and includes a blower fan 46A. The blower fan 46A is operated to generate, in the cowl duct part 16, airflow AR directed from the outside air inlets 14C to the air outlet 12G.

Cowl Structure 10

Figure 2:
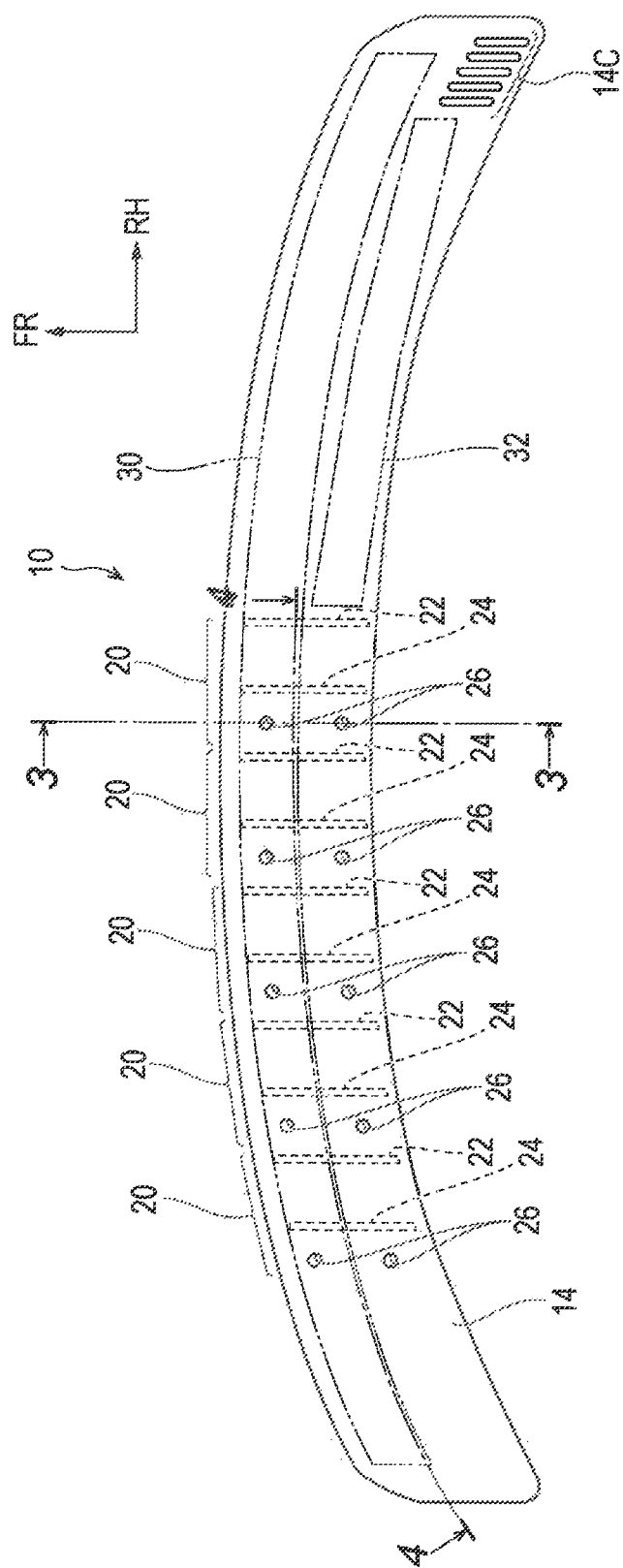
FIG. 2 is an enlarged plan view of the vehicle cowl structure illustrated in FIG. 1.
Figure 3:
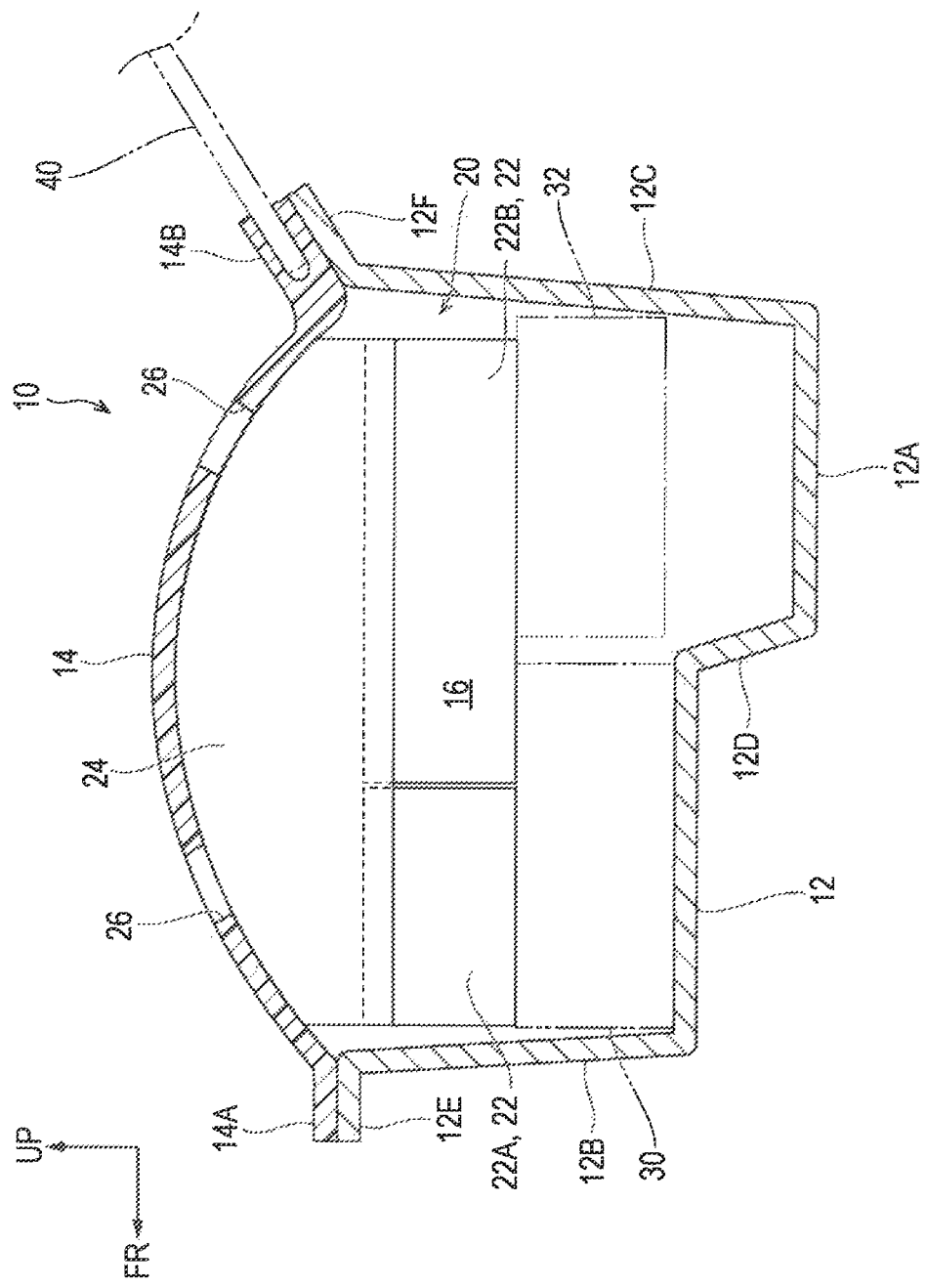
FIG. 3 is a schematic, left sectional view (enlarged sectional view taken along line 3-3 in FIG. 2) of an inside of the vehicle cowl structure illustrated in FIG. 2.

As illustrated in FIGS. 2 and 3, the cowl structure 10 includes a cowl body 12, a cowl top panel 14, and a gas-liquid separation mechanism 20. In one embodiment, the cowl top panel 14 may serve as a "cowl panel".

Cowl Body 12

The cowl body 12 is made of a metal plate. The cowl body 12 extends in the vehicle width direction and has longitudinal ends joined to an apron member (not illustrated). The apron member constitutes a frame member of the vehicle V. As illustrated in FIG. 3, the cowl body 12 has a recessed shape with an upper opening when viewed in the longitudinal direction thereof. In one example, the cowl body 12 includes a bottom wall 12A, a front wall 12B, and a rear wall 12C. The front wall 12B extends upward from a front end of the bottom wall 12A. The rear wall 12C extends upward from a rear end of the bottom wall 12A. A stepped part 12D is formed at a front-rear intermediate part of the bottom wall 12A. A front part of the bottom wall 12A is higher in position than a rear part of the bottom wall 12A.

A flange 12E bent forward is formed at an upper end of the front wall 12E of the cowl body 12. A flange 12F is formed at an upper end of the rear wall 12C of the cowl body 12. The flange 12F is bent rearward and obliquely upward and disposed below the lower end (front end) of the windshield glass 40. The rear wall 12C of the cowl body 12 is coupled to a dash panel (not illustrated) that partitions an engine room and the vehicle interior of the vehicle V. The rear wall 12C of the cowl body 12 has, at its left end, the air outlet 12G (see FIG. 4) penetrating therethrough. The one end of the air-conditioning duct 44 is coupled to the air outlet 12G.

The cowl body 12 partly accommodates an airbag apparatus 30 and a wiper unit 32. In one embodiment, the airbag apparatus 30 and the wiper unit 32 may serve as "mounted components". The airbag apparatus 30 is disposed on the front part of the bottom wall 12A and fixed to the cowl body 12. The wiper unit 32 is accommodated in a rear part of the cowl body 12 and fixed to the cowl body 12.

Cowl Top Panel 14

As illustrated in FIGS. 2 to 4, the cowl top panel 14 is made of a resin material. The cowl top panel 14 has a substantially long plate shape extending in the vehicle width direction, and is substantially arcuately curved to have a front-rear intermediate part protruding upward when viewed in the longitudinal direction of the cowl top panel 14 (see FIG. 3). A flange 14A is formed at a front end of the cowl top panel 14. The flange 14A protrudes forward, is disposed on the flange 12E of the cowl body 12, and is fixed to the flange 12E by a fastening member such as a clip. A panel coupler 14B is formed at a rear end of the cowl top panel 14. The panel coupler 14B has a substantially U shape that is open rearward and obliquely upward when viewed from the longitudinal direction of the cowl top panel 14. The lower end of the windshield glass 40 is inserted into the panel coupler 14B. The panel coupler 14B is fixed to the flange 12F of the cowl body 12 by a fastening member such as a clip. Thus, the upper opening of the cowl body 12 is closed by the cowl top panel 14. The inside of the cowl structure 10 defined by the cowl body 12 and the cowl top panel 14 serves as the cowl duct part 16.

The cowl top panel 14 has, at its right end, outside air inlets 14C penetrating therethrough. The outside air inlets 14C each have a substantially long hole shape whose longitudinal direction corresponds to the front-rear direction, and are disposed side by side at predetermined intervals in the left-right direction. This allows communication, through the outside air inlets 140, between the inside and the outside of the cowl duct part 16.

Gas-Liquid Separation Mechanism 20

The gas-liquid separation mechanism 20 is provided to the cowl duct part 16. The gas-liquid separation mechanism 20 is configured to, when outside air is introduced into the cowl duct part 16, allow air and liquid such as rainwater contained in the outside air to be separated from each other. The cowl structure 10 includes multiple gas-liquid separation mechanisms 20. In the present embodiment, the cowl structure 10 includes five gas-liquid separation mechanisms 20 disposed side by side in the vehicle width direction in the cowl duct part 16 (see FIGS. 2 and 4). In one example, the five gas-liquid separation mechanisms 20 are disposed between the outside air inlets 14C and the air outlet 12G in the vehicle width direction.

Each of the gas-liquid separation mechanisms 20 includes a lower blocker 22, an upper blocker 24, and air suction ports 26. In one example, the air suction ports 26 may serve as a pair of front and rear "air suction parts".

The lower blocker 22 has a substantially plate shape whose plate thickness direction corresponds to the left-right direction. The lower blocker 22 is provided to an upper wall of an airbag case constituting an outer shell of the airbag apparatus 30, and extends upward from the airbag apparatus 30. The lower blocker 22 includes blocking plates 22A and 22B divided into two in the front-rear direction. Edges of the blocking plate 22A and the blocking plate 22B that face each other coincide with a split position of the airbag case. The front end of the lower blocker 22 is disposed near a rear side of the front wall 12B of the cowl body 12. The rear end of the lower blocker 22 is disposed near a front side of the rear wall 12C of the cowl body 12.

The upper blocker 24 has a substantially rectangular plate shape whose plate thickness direction corresponds to the left-right direction and longitudinal direction corresponds to the front-rear direction. The upper blocker 24 is provided to a lower surface of the cowl top panel 14 and extends downward from the cowl top panel 14. A front-rear dimension of the upper blocker 24 substantially coincides with a front-rear dimension of the lower blocker 22. The upper blocker 24 is disposed on a left side with respect to the lower blocker 22, that is, on an air outlet 12G side, and is higher in position than the lower blocker 22. In the up-down direction, the lower end of the upper blocker 24 is lower in position than the upper end of the lower blocker 22. That is, when viewed in the longitudinal direction of the cowl body 12, the lower end of the upper blocker 24 and the upper end of the lower blocker 22 overlap each other.

The air suction ports 26 are holes formed in the cowl top panel 14. The air suction ports 26 are disposed on a left side with respect to the upper blocker 24, that is, on the air outlet 120 side. In more detail, a distance L1 between the upper blocker 24 and each air suction port 26 in the left-right direction is shorter than a distance L2 between the lower blocker 22 and the upper blocker 24 (see FIG. 4). The air suction ports 26 are respectively formed in a front part and a rear part of the cowl top panel 14. That is, the air suction ports 26 are respectively formed on a front side and a rear side with respect to the top of the cowl top panel 14. The air suction ports 26 each serve as a hole through which the air in a left space of the upper blocker 24 in the cowl duct part 16 is drawn out of the cowl duct part 16. In one example, traveling airflows flowing rearward along an upper surface of the cowl top panel 14 during traveling of the vehicle V cause a negative pressure in an upper space of the cowl top panel 14, thus causing the air in the left space of the upper blocker 24 to be drawn out of the cowl duct part 16 through the air suction ports 26.

The bottom wall 12A of the cowl body 12 has a drainage outlet (not illustrated) from which the liquid falling on the bottom wall 12A of the cowl body 12 is drained out of the cowl body 12.

Operation and Effects

Operation and effects of the present embodiment will now be described.

In the cowl structure 10 with the above structure, the outside air inlets 140 are formed at the right end of the cowl top panel 14, and the air outlet 12G is formed at the left end of the cowl body 12. When the air conditioner 46 of the vehicle V is turned on, the blower fan 46A of the air conditioner 46 is operated to allow the air in the cowl duct part 16 to be drawn in by suction from the air outlet 12G toward the air-conditioning duct 44. Consequently, the outside air (air) is introduced into the cowl duct part 16 through the outside air inlets 140, and airflow AR directed from the outside air inlets 14C to the air outlet 12G is generated in the cowl duct part 16.

Here, water (liquid) such as rainwater may enter the cowl duct part 16 through the outside air inlets 14C together with air. At this time, liquid water having relatively large particles falls on the bottom wall 12A of the cowl body 12 and is drained from the drainage outlet of the cowl body 12. On the other hand, for example, water such as atomized water having relatively small particles does not fall on the bottom wall 12A of the cowl body 12, and flows leftward in the cowl duct part 16 as the airflow AR together with the air.

Then, as illustrated in FIG. 4, the airflow AR hits a right side surface of the lower blocker 22 in the gas-liquid separation mechanism 20 which is the first one from the right. Thus, the atomized water contained in the airflow AR adheres to the lower blocker 22, and the air and the water are separated from each other in the lower blocker 22. When the airflow AR repeatedly hits the lower blocker 22, the water adhered to the lower blocker 22 is converted into droplets and falls on the airbag apparatus 30 or the bottom wall 12A of the cowl body 12 from the lower blocker 22. The liquid that has fallen on the airbag apparatus 30 flows along an outer peripheral part of the airbag apparatus 30 and falls on the bottom wall 12A of the cowl body 12. Furthermore, when the airflow AR hits the lower blocker 22, the direction of the airflow AR is changed to a leftward and obliquely upward direction, and the airflow AR flows toward the upper blocker 24. Consequently, the airflow AR from which the water has been removed in the lower blocker 22 flows toward the upper blocker 24.

Then, the airflow AR flowing toward the upper blocker 24 hits a right side surface of the upper blocker 24. Consequently, the atomized water contained in the airflow AR adheres to the upper blocker 24, and the air and the water are separated from each other in the upper blocker 24. That is, the upper blocker 24 allows the air and the water remaining in the airflow AR passing through the lower blocker 22 to be separated from each other. When the airflow AR repeatedly hits the upper blocker 24, the water adhered to the upper blocker 24 is converted into droplets and falls on the bottom wall 12A of the cowl body 12 from the upper blocker 24.

In the traveling of vehicle V, the traveling airflows flow rearward along the upper surface of cowl top panel 14. This causes a negative pressure in the upper space of the cowl top panel 14, thus causing the air in the left space of the upper blocker 24 to be drawn out of the cowl duct part 16 through the air suction ports 26 (see arrows A in FIG. 4). Thus, the airflow AR satisfactorily flows from the lower side to the left side of the upper blocker 24 without stagnating in the lower space of the upper blocker 24. That is, the airflow AR flows toward the lower blocker 22 in the gas-liquid separation mechanism 20 which is the second one from the right, and hits a right side surface of the lower blocker 22. During traveling of the vehicle V, as described above, the upper space of the cowl top panel 14 is subjected to the negative pressure, and the air is drawn out of the cowl duct part 16 through the air suction ports 26, so that the air suction ports 26 serve as a so-called one-way valve. This reduces entry of water such as rainwater into the cowl duct part 16 through the air suction ports 26.

Then, the airflow AR that has passed through the gas-liquid separation mechanism 20 which is the first one from the right passes through the gas-liquid separation mechanisms 20 which are the second one to the fifth one from the right in this order. At this time, in the same manner as described above, the lower blocker 22 and the upper blocker 24 in the gas-liquid separation mechanism 20 allow the air and the water remaining in the airflow AR to be separated from each other. That is, every time the airflow AR passes through the gas-liquid separation mechanism 20, the remaining amount of water contained in the airflow AR is reduced, and the dry air flows to the air outlet 12G side. Then, the dry air from which the water has been separated flows from the air outlet 12G to the air-conditioning duct 44, and is supplied into the vehicle interior.

As described above, the gas-liquid separation mechanism 20 of the cowl structure 10 includes the lower blocker 22 extending upward from the airbag apparatus 30, the upper blocker 24 extending downward from the cowl top panel 14, and the pair of front and rear air suction ports 26 formed in the cowl top panel 14. The upper blocker 24 is disposed on the left side with respect to the lower blocker 22 (on the air outlet 12G side and on the downstream side of the airflow AR), and the air suction ports 26 are disposed on the left side with respect to the upper blocker 24. This allows the airflow AR introduced through the outside air inlets 14C into the cowl duct part 16 to be brought into contact with the lower blocker 22 and the upper blocker 24, and the air and the liquid contained in the airflow AR to be gradually separated from each other by way of the lower blocker 22 and the upper blocker 24.

The air in the left space of the upper blocker 24 in the cowl duct part 16 is drawn out of the cowl duct part 16 through the air suction ports 26, thus allowing the airflow AR to be satisfactorily flown from the lower side to the left side (the air outlet 12G side) of the upper blocker 24. That is, since the lower blocker 22 and the upper blocker 24 are disposed to block the passage of the airflow AR in the cowl duct part 16, the airflow AR may stagnate after the airflow AR hits the lower blocker 22 and the upper blocker 24. To address such a situation, the air on the downstream side with respect to the upper blocker 24 is drawn out of the cowl duct part 16 through the air suction ports 26, thus reducing the stagnation of the airflow AR hitting the upper blocker 24 and allowing the airflow AR to be satisfactorily flown to the air outlet 12G side. That is, after the separation between the air and the liquid contained in the airflow AR by way of the lower blocker 22 and the upper blocker 24, the airflow AR can be guided to the air outlet 12G side by the air suction ports 26. As described above, according to the cowl structure 10 of the present embodiment, it is possible to achieve satisfactory separation between air and liquid in the cowl duct part 16.

The cowl structure 10 includes the gas-liquid separation mechanisms 20 disposed side by side in the vehicle width direction. Consequently, the air and the liquid contained in the airflow AR are separated from each other every time the airflow AR flowing through the cowl duct part 16 passes through the gas-liquid separation mechanism 20. Thus, it is possible to achieve effective separation between air and liquid introduced into the cowl duct part 16 through the outside air inlets 14C.

The cowl top panel 14 has the long plate shape extending in the vehicle width-direction, and is arcuately curved to have the front-rear intermediate part protruding upward when viewed from the longitudinal direction of the cowl top panel 14. That is, the cowl top panel 14 has no corners at the front end and the rear end thereof, and has a smooth curved shape when viewed from the longitudinal direction thereof. This can reduce disturbance of the airflow AR, for example, even when the airflow AR flowing from the lower blocker 22 toward the upper blocker 24 hits the cowl top panel 14. That is, it is possible to reduce occurrence of a turbulent flow in a right space of the upper blocker 24. Thus, the airflow AR flowing through the cowl duct part 16 can be satisfactorily flown toward the air outlet 12G.

The upper end of the lower blocker 22 and the lower end of the upper blocker 24 positionally overlap each other in the up-down direction. That is, when viewed from the longitudinal direction of the cowl body 12, the upper end of the lower blocker 22 and the lower end of the upper blocker 24 overlap each other. This allows the airflow AR that hits the lower blocker 22 and flows leftward from the lower blocker 22 to be satisfactorily hit to the upper blocker 24.

The distance L1 between the upper blocker 24 and each air suction port 26 in the left-right direction is shorter than the distance L2 between the lower blocker 22 and the upper blocker 24. This can cause the air near the left side of the upper blocker 24 to be drawn out of the cowl duct part 16 through the air suction ports 26. Thus, as compared with a case where the distance L1 between the upper blocker 24 and each air suction port 26 is hypothetically longer than the distance L2 between the lower blocker 22 and the upper blocker 24, the airflow AR having passed through the upper blocker 24 can be more satisfactorily guided toward the air outlet 12G.

In the present embodiment, although the lower blocker 22 is provided to the airbag case of the airbag apparatus 30, the lower blacker 22 may be provided to the bottom wall 12A of the cowl body 12 in a case where the airbag apparatus 30 is not mounted in the cowl body 12.

In addition, in the present embodiment, the lower blocker 22 has the plate shape whose plate thickness direction corresponds to the left-right direction. That is, the right side surface of the lower blocker 22 is formed along a plane perpendicular to the left-right direction. Alternatively, the right side surface of the lower blocker 22 may be formed to be slightly inclined leftward toward an upper side when viewed from the front side. This allows the airflow AR that has hit the lower blocker 22 to be satisfactorily flown toward the upper blocker 24.

In the gas-liquid separation mechanism 20 of the present embodiment, although the pair of front and rear air suction ports 26 is formed in the cowl top panel 14, the air suction port 26 formed in the front part of the cowl top panel 14 is not necessarily provided. That is, since the cowl top panel 14 is arcuately curved to have the front-rear intermediate part protruding upward when viewed from the longitudinal direction of the cowl top panel 14, even with the configuration in which the air suction port 26 is provided to the rear part alone of the cowl top panel 14, the air in the cowl duct part 16 can be sufficiently drawn out through the air suction port 26 during the traveling of the vehicle.

The invention claimed is:

1. A vehicle cowl structure for a vehicle, the vehicle cowl structure comprising:
    a cowl body extending in a vehicle width direction on a vehicle front side of a lower end of a windshield glass of the vehicle, and having a recessed shape with an upper opening when viewed in a longitudinal direction of the cowl body;
    a cowl panel extending in the vehicle width direction on a vehicle upper side of the cowl body, closing the upper opening of the cowl body, and having an outside air inlet, the outside air inlet being disposed at an end of the cowl panel on a first side in the vehicle width direction and configured to allow outside air to be introduced into the cowl body;
    an air outlet disposed at an end of the cowl body on a second side in the vehicle width direction and configured to allow air inside the cowl body to be discharged toward a vehicle interior of the vehicle; and
    a gas-liquid separation mechanism disposed between the outside air inlet and the air outlet, and configured to allow the air and liquid inside the cowl body to be separated from each other,
    wherein the gas-liquid separation mechanism comprises
    a lower blocker provided to a bottom wall of the cowl body or a mounted component accommodated in the cowl body, and extending from the bottom wall or the mounted component to the vehicle upper side,
    an upper blocker provided to the cowl panel, disposed on the second side in the vehicle width direction with respect to the lower blocker, and extending from the cowl panel to a vehicle lower side, and
    an air suction part provided to the cowl panel, disposed on the second side in the vehicle width direction with respect to the upper blocker, and configured to allow the air inside the cowl body to be drawn out.

2. The vehicle cowl structure according to claim 1, wherein the cowl panel is arcuately curved to have a front-rear intermediate part protruding toward the vehicle upper side when viewed from a longitudinal direction of the cowl panel.

3. The vehicle cowl structure according to claim 2, wherein the air suction part is disposed at a rear part of the cowl panel.

4. The vehicle cowl structure according to claim 1, wherein an upper end of the lower blocker and a lower end of the upper blocker positionally overlap each other in a vehicle up-down direction.

5. The vehicle cowl structure according to claim 2, wherein an upper end of the lower blocker and a lower end of the upper blocker positionally overlap each other in a vehicle up-down direction.

6. The vehicle cowl structure according to claim 3, wherein an upper end of the lower blocker and a lower end of the upper blocker positionally overlap each other in a vehicle up-down direction.

7. The vehicle cowl structure according to claim 1; wherein the gas-liquid separation mechanism comprises multiple gas-liquid separation mechanisms disposed side by side in the vehicle width direction.

8. The vehicle cowl structure according to claim 2, wherein the gas-liquid separation mechanism comprises multiple gas-liquid separation mechanisms disposed side by side in the vehicle width direction.

9. The vehicle cowl structure according to claim 3, wherein the gas-liquid separation mechanism comprises multiple gas-liquid separation mechanisms disposed side by side in the vehicle width direction.

10. The vehicle cowl structure according to claim 4, wherein the gas-liquid separation mechanism comprises multiple gas-liquid separation mechanisms disposed side by side in the vehicle width direction.

11. The vehicle cowl structure according to claim 5, wherein the gas-liquid separation mechanism comprises multiple gas-liquid separation mechanisms disposed side by side in the vehicle width direction.

12. The vehicle cowl structure according to claim 6, wherein the gas-liquid separation mechanism comprises multiple gas-liquid separation mechanisms disposed side by side in the vehicle width direction.

\* \* \* \* \*